United States Patent [19]

Brothers

[11] Patent Number: 5,251,543
[45] Date of Patent: Oct. 12, 1993

[54] APPARATUS FOR SPIRAL SLICING A BONELESS CUT OF MEAT

[75] Inventor: Daniel L. Brothers, Norcross, Ga.

[73] Assignee: The Original Honey Baked Ham Company of Georgia, Inc., Atlanta, Ga.

[21] Appl. No.: 858,065

[22] Filed: Mar. 26, 1992

[51] Int. Cl.⁵ .................. A23L 1/31; A23N 7/00; A47J 17/00

[52] U.S. Cl. .................. 99/538; 99/419; 99/421 V; 99/593

[58] Field of Search ............ 99/537, 538, 568, 541, 99/593–599, 491, 492, 419–421 V; 426/641, 645; 83/488, 483, 932; 82/48

[56] References Cited

U.S. PATENT DOCUMENTS

| | | | |
|---|---|---|---|
| 1,819,301 | 8/1931 | Noble | 99/421 V |
| 2,470,078 | 9/1944 | Hoenselaar . | |
| 2,558,579 | 6/1951 | Polk, Sr. et al. . | |
| 2,581,570 | 1/1952 | Amanatides | 99/421 V |
| 2,599,328 | 6/1952 | Hoenselaar . | |
| 2,654,307 | 10/1953 | Nisenson | 99/421 H |
| 2,687,080 | 8/1954 | Dorin | 99/421 V |
| 2,789,908 | 4/1957 | Doepken . | |
| 3,153,436 | 10/1964 | Chesley . | |
| 3,604,341 | 9/1971 | Coroneos . | |
| 3,817,164 | 6/1974 | Hintze . | |
| 3,943,837 | 3/1976 | Trkla | 99/421 H |
| 3,951,054 | 4/1976 | Frentzel . | |
| 4,050,370 | 9/1977 | Schmidt et al. . | |
| 4,126,086 | 11/1978 | Valade | 99/419 |
| 4,170,174 | 10/1979 | Ditty et al. | 99/538 |
| 4,211,159 | 7/1980 | Coatu . | |
| 4,286,133 | 8/1981 | Einset et al. | 99/421 X |
| 4,287,820 | 9/1981 | Urban . | |
| 4,332,190 | 6/1982 | Mart . | |
| 4,386,560 | 6/1983 | Ditty | 99/538 |
| 4,412,483 | 11/1983 | Hoegh . | |
| 4,441,411 | 4/1984 | Mullins, Jr. . | |
| 4,810,856 | 3/1989 | Jovanovic | 99/419 |
| 4,817,514 | 4/1989 | Hitch et al. | 99/419 |
| 4,821,635 | 4/1989 | Logan, Jr. . | |
| 5,030,472 | 7/1991 | Logan, Jr. . | |

FOREIGN PATENT DOCUMENTS

| | | | |
|---|---|---|---|
| 0332505 | 9/1989 | European Pat. Off. | 99/419 |
| 908646 | 10/1962 | United Kingdom | 99/421 H |

Primary Examiner—Timothy F. Simone
Attorney, Agent, or Firm—Mason, Fenwick & Lawrence

[57] ABSTRACT

An accessory for supporting a boneless cut of meat, for use in conjunction with a spiral meat slicer having an upper support bracket and a rotatable turntable positioned below the support bracket, and in which the turntable has a plurality of prongs extending upwardly therefrom, comprises a skewer assembly including a skewer and a base for supporting the skewer, a vertically-adjustable lower stop member slidably carried by the skewer, a vertically-adjustable upper prong member slidably carried by the skewer and positioned above the stop member, and a spindle assembly including a rod for slidably engaging the bracket and an adapter having a central bore therein for receiving the apex of the skewer. The base has a plurality of holes formed therein dimensioned and positioned to receive the prongs of the turntable. The skewer has a generally cruciform cross-section between its apex and its foot, and the stop member and the prong member each has an axial aperture therethrough of generally cruciform cross-section dimensioned to receive the skewer. The prong member includes a plurality of prongs extending downwardly from its lower surface for engaging the meat.

29 Claims, 1 Drawing Sheet

APPARATUS FOR SPIRAL SLICING A BONELESS CUT OF MEAT

BACKGROUND OF THE INVENTION

1. Field of the Invention

The present invention relates to apparatus for spiral slicing a boneless cut of meat. More specifically, the invention relates to an accessory for use with a spiral meat slicer designed to form a continuous spiral slice on a piece of meat which has a center bone, so that the slicer can be used for a boneless cut of meat.

2. Related Art

Spiral sliced meat products are very popular, and numerous devices exist for producing a continuous spiral slice in a cut of meat having a center bone therein. Examples of such devices include Hoenselaar U.S. Pat. No. 2,470,078; Hoenselaar U.S. Pat. No. 2,599,328; Chesley U.S. Pat. No. 3,153,436; Frentzel U.S. Pat. No. 3,951,054; Schmidt et al U.S. Pat. No. 4,050,370; Urban U.S. Pat. No. 4,287,820; Mart U.S. Pat. No. 4,332,192; Hoegh U.S. Pat. No. 4,412,483; and Mullins, Jr. U.S. Pat. No. 4,441,411.

Typically, these devices include upper and lower pronged chucks for holding the meat while it is rotated about a longitudinal axis passing through the chucks, and a rotating blade or reciprocating knife which is indexed to move upwardly or downwardly as the meat is rotated. However, all of these devices rely on the center bone to provide a structural support for the meat. These devices cannot be used with a boneless cut of meat which has no support structure of its own.

This problem is addressed by Logan, Jr. U.S. Pat. Nos. 4,821,635 and 5,030,472. Logan, Jr. discloses a meat slicing apparatus in which a meat spit is provided between the upper and lower chucks for supporting a boneless cut of meat. However, the lower chuck must be provided with a slit for receiving the bottom of the spit, while the upper chuck and the shaft supporting the upper chuck must be provided with blind holes for receiving the upper end of the spit. Thus, Logan, Jr.'s spit can only be used in meat slicing apparatus having the appropriately adapted upper and lower chucks, and cannot be used with other meat slicing apparatus. Further, other than the upper and lower chucks at the upper and lower ends of the meat, there is no mechanism for the transmission of torque for rotation of the meat about its rotational axis. It is the solution of these and other problems to which the present invention is directed.

SUMMARY OF THE INVENTION

It is therefore a primary object of the present invention to provide an accessory for supporting a boneless cut of meat which can be used with a wide variety of spiral meat slicers.

It is still another object of the present invention to provide an accessory for supporting a boneless cut of meat which provides a mechanism for transmitting torque for rotation of the meat about its rotational axis along substantially the full length of its rotational axis.

These and other objects of the invention are achieved by the provision of an accessory for supporting a boneless cut of meat, for use in conjunction with a spiral meat slicer having an upper support bracket and a rotatable turntable positioned below the support bracket, and in which the turntable has a plurality of prongs extending upwardly therefrom. The accessory comprises a skewer assembly including a skewer and a base for supporting the skewer, a vertically-adjustable lower stop member slidably carried by the skewer, a vertically-adjustable upper prong member carried by the skewer and positioned above the stop member, and a spindle assembly including a bracket-engaging member for slidably engaging the upper support bracket and a skewer-receiving member for receiving the apex of the skewer. The base has a plurality of holes formed therein dimensioned and positioned to receive the prongs of the turntable.

In one aspect of the invention, the skewer has a generally cruciform cross-section between its apex and its foot, and the stop member and the prong member each has an axial aperture therethrough of generally cruciform cross-section dimensioned to slidably receive the skewer.

In another aspect of the invention, the bracket-engaging member comprises a rod for sliding insertion in the bracket, and the spindle assembly includes a spindle, the rod being inserted in the upper end of the spindle. A spindle adapter is attached to the lower end of the spindle and has a central cylindrical bore formed therethrough for receiving the apex of the skewer.

In still another aspect of the invention, the prong member includes a plurality of prongs extending downwardly from its lower surface for engaging the meat.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENT

Figure 1:
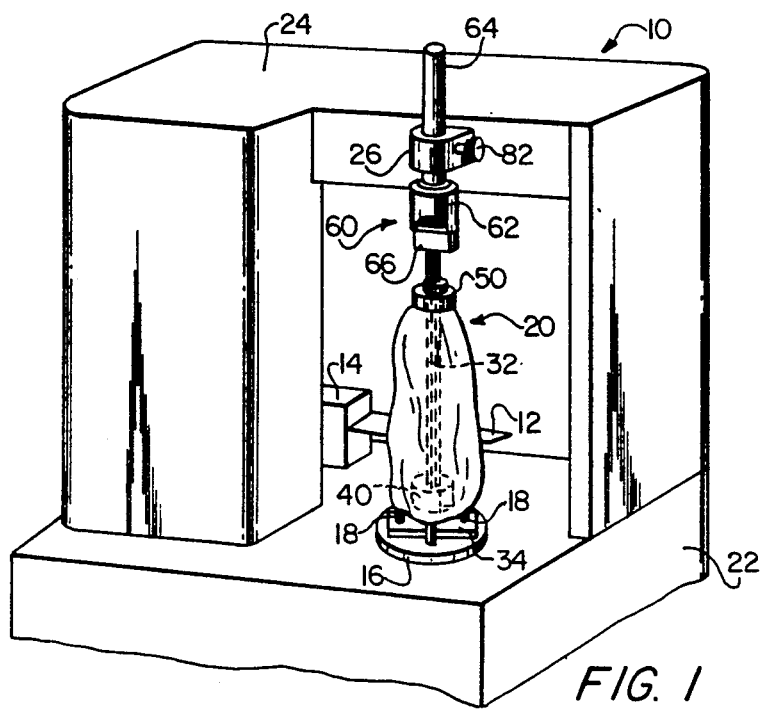
FIG. 1 is a perspective view of a spiral meat slicer provided with an accessory for supporting a boneless cut of meat in accordance with the present invention.

In describing a preferred embodiment of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring now to FIG. 1, there is shown apparatus 10 for spiral slicing a boneless cut of meat of the type disclosed in Chesley U.S. Pat. No. 3,153,436 and Schmidt et al U.S. Pat. No. 4,050,370, both of which are expressly incorporated herein by reference in their entireties. Apparatus 10 comprises a knife blade 12 secured to a movable support block 14, a cutter drive mechanism (not shown) for driving blade 12 and support block 14, and a rotatable turntable 16 having a plurality of prongs 18 extending upwardly therefrom. A support accessory 20 in accordance with the present invention is positioned on turntable 16 for supporting the meat to be cut.

Apparatus 10 further comprises a turntable drive mechanism (not shown) for driving turntable 16, a support structure 22 for supporting the cutter turntable drive mechanism and turntable 16 and for housing the turntable drive mechanism, and upper housing 24 positioned on support structure 22. Upper housing 24 includes a bracket 26 for supporting the top portion of support accessory 20.

Figure 2:
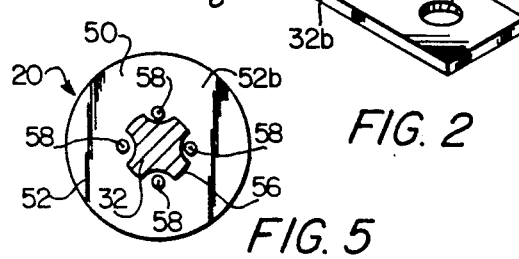
FIG. 2 is an enlarged view of the accessory of FIG. 1.

Referring now to FIGS. 1 and 2, support accessory 20 comprises a skewer assembly 30 including a skewer 32, a base plate 34 for supporting skewer 32, a vertically-adjustable lower stop member or butt stop 40 slidably carried by skewer 32, a vertically-adjustable upper prong member 50 carried by skewer 32 and positioned above stop member 40, and a vertically-adjustable spindle assembly 60 slidably carried by bracket 26 for engaging the upper end of skewer 32.

As best shown in FIG. 2, skewer 32 has a generally conical apex 32a and a foot 32b of generally square cross-section. Skewer 32 has a generally cruciform transverse cross-section between apex 32a and foot 32b. Base 34 comprises a plate having a pair of spaced holes 36 drilled therethrough which are dimensioned and positioned to receive prongs 18. Skewer 32 and base 34 preferably are made of stainless steel. Skewer 32 is affixed to the center of base 34, for example by welding.

The cruciform cross-section of skewer 32 provides projections which will prevent slippage between the meat and skewer 32 and transmit the torque from turntable 16 to the meat for rotation of the meat about its rotational axis along substantially the full length of its rotational axis. In addition, the cruciform cross-section ensures that only a small portion of the meat remains unsliced at the core or center. Moreover, it reduces the internal stresses on the meat during the skewering process, thus helping to reduce splitting of the meat.

Figure 6:
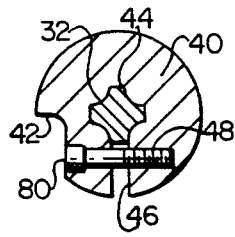
FIG. 6 is a cross-sectional view taken along line 6—6 of FIG. 2.

Referring now to FIGS. 2 and 6, stop member 40 is generally circular in cross-section, and has an L-shaped first notch 42 formed in its circumference, a cruciform central axial aperture 44 formed therethrough, and a radial second notch 46 formed therein in communication with axial aperture 44. Axial aperture 44 is dimensioned to permit stop member 40 to frictionally receive skewer 32. A cylindrical aperture 48 is formed transversely in two parts, a first unthreaded part between first notch 42 and radial aperture 46, and a second threaded part between radial aperture 46 and the perimeter of stop member 40. A first set screw 80 is inserted through the first unthreaded part of aperture 48 and into the second threaded part of aperture 48 for clamping stop member 40 in position on skewer 32.

Figures 4, 5:
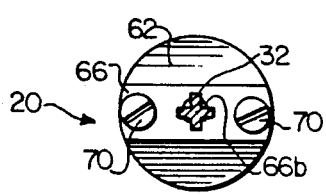
FIG. 4 is a cross-sectional view taken along line 4—4 of FIG. 3.
FIG. 5 is a cross-sectional view taken along line 5—5 of FIG. 2.

Referring now to FIGS. 2 and 5, prong member 50 comprises a head portion 52 of circular cross-section and having upper and lower surfaces 52a and 52b, a necked-in portion 54 also of circular cross-section extending upwardly from upper surface 52a, a cruciform central axial aperture 56 formed through head portion 52 and necked-in portion 54, and a plurality of prongs 58 extending perpendicularly downwardly from lower surface 52b. Aperture 56 is dimensioned slightly larger than skewer 32 to permit prong member 50 to slidably receive skewer 32.

As best seen in FIG. 5, prongs 58 are positioned one midway between each pair of arms of axial aperture 56 and centered on the circumference of a circle having a diameter approximately equal to the distance across two opposite arms of axial aperture 56. The diameter of necked-in portion 54 is slightly greater than that of the circle on which prongs 58 are centered.

In use, prong member 50 grasps the top of the meat to eliminate any slippage at the end of the cut.

Preferably, stop member 40 and prong member 50 are made of a material such as Deirin TM (i.e. a polyoxymethiylenetype acetal resin), which is sturdy, safe for use with foods, and easily washed.

Figure 3:
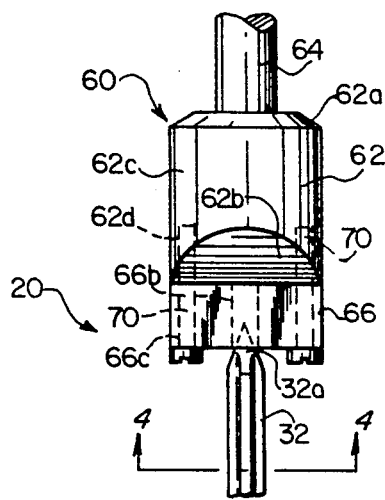
FIG. 3 is a plan view of the upper part of the accessory of FIG. 1.

Referring now to FIGS. 2–4, spindle assembly 60 comprises a spindle 62 having a frusto-conical upper end 62a, a tapered lower end 62b, and a generally cylindrical central portion 62c intermediate upper and lower ends 62a and 62b. A rod 64 is inserted in upper end 62a, while a spindle adapter 66 is attached to the flat bottom of lower end 62b. Spindle adapter 66 is attached to the bottom of lower end 62b by a pair of screws 70 inserted in a pair of spaced-apart, unthreaded bores 66a through spindle adapter 66 and in a pair of spaced-apart, internally-threaded bores 62d in lower end 62b of spindle 62 and in registration with bores 62d.

Spindle adapter 66 also includes a central axial cylindrical bore 66b for receiving at least a portion of apex 32a of skewer 32. A second set screw 82 is inserted in an aperture (not shown) through bracket 26 for holding rod 64 in position in bracket 26.

In use, apparatus 10 is adjusted prior to slicing a cut of meat as follows. First, rod 64 is inserted into bracket 26, and spindle assembly 60 is raised until upper end 62a abuts the bottom of bracket 26. The cutter drive mechanism is then activated to move knife blade 12 upward to its highest position, as described in U.S. Pat. Nos. 3,153,436 and 4,050,370. Base 34 of skewer assembly 30 is then placed on turntable 16 with prongs 18 of turntable 16 engaging holes 36 of base 34. Prong member 50 is placed on skewer 32 with prongs 58 facing upwardly towards bracket 26 and away from turntable 16. Spindle assembly 60 can then be lowered so that bore 66b engages apex 36 of skewer 32. The radial position of the blade 12 relative to skewer 32 (sometimes referred to as the "bone-in") is then adjusted so that blade 12 is just touching necked-in portion 54 of prong member 50. Because the diameter of necked-in portion 54 is slightly greater than the greatest width of skewer 32, skewer 32 and prongs 58 will be positioned inside the core around which blade 12 slices.

Once the radial position of blade 12 relative to skewer 32 has been adjusted, the position of stop member 40 is adjusted. This is accomplished by lowering blade 12, and then positioning stop member 40 so that blade 12 rides just above it. Stop member 40 is fixed in its adjusted position by tightening set screw 80.

Once the position of blade 12 and stop member 40 have been adjusted, apparatus 10 is ready to receive the cut of meat to be sliced. Skewer 32 is removed from turntable 16 with stop member 40 still in place, and pushed into the meat along its lengthwise center line or axis until one end of the meat abuts stop member 40. Prong member 50 is then inserted back onto skewer 32 with prongs 58 extending downwardly towards the meat, and prong member 50 is pushed towards stop member 40 until prongs 58 pierce the meat as deeply as possible.

With the meat positioned on the skewer, skewer assembly 30 is then repositioned on turntable 16 and held in place by adjusting the position of spindle assembly 60 until bore 66b engages apex 36 of skewer 32. The meat slicer is then run to slice the meat as provided in U.S. Pat. Nos. 3,153,436 and 4,050,370. Because of the provision of stop member 40 at the bottom of the cut of meat and prong member 50 at the top, in combination with the torque-transmitting cruciform cross-section of skewer 32, the present invention enables continuous top-to-bottom slicing which cannot be accomplished using prior art mechanisms.

Modifications and variations of the above-described embodiments of the present invention are possible, as appreciated by those skilled in the art in light of the above teachings. For example, base 34 of skewer assembly 30 can be configured for use with turntables having more than two prongs by providing a number of holes corresponding to the number of turntable prongs and by dimensioning and positioning the holes to receive the turntable prongs. Also, the transverse cross-section of skewer 32 can be other than cruciform, as long as it provides projections or the structural equivalent thereof for transmitting torque to the meat. Further, the support accessory according to the invention can be used with any spiral slicing apparatus in which the upper prong member is carried by a rod or shaft in axial alignment with the turntable, and in which the rod or shaft is vertically adjustable in a support bracket.

It is therefore to be understood that, within the scope of the appended claims and their equivalents, the invention may be practiced otherwise than as specifically described.

What is claimed is:

1. An accessory for supporting a boneless cut of meat, for use in conjunction with a spiral meat slicer having an upper support bracket and a rotatable turntable positioned below the support bracket, the turntable having a plurality of prongs extending upwardly therefrom, said accessory comprising:
   a skewer assembly including a skewer and a base for supporting said skewer, said skewer having an apex and a foot at opposite ends thereof, said foot being attached to said base, and said base having a plurality of holes formed therein dimensioned and positioned to receive the prongs of the turntable;
   a vertically-adjustable stop member slidably carried by said skewer;
   a vertically-adjustable prong member slidably carried by said skewer and positioned above said stop member; and
   a spindle assembly including bracket-engaging means for engaging the bracket and skewer-receiving means for receiving said apex of said skewer.

2. The accessory of claim 1, wherein said skewer has a generally cruciform cross-section between said apex and said foot.

3. The accessory of claim 2, wherein said stop member and said prong member each has an axial aperture therethrough of generally cruciform cross-section dimensioned to receive said skewer.

4. The accessory of claim 1, further including locking means for locking said stop member in position on said skewer.

5. The accessory of claim 1, wherein said bracket-engaging means comprises a rod, and wherein said spindle assembly further includes:
   a spindle having an upper and a lower end, said rod being inserted in said upper end; and
   a spindle adapter attached to said lower end, said skewer-receiving means comprising a longitudinal cylindrical bore formed in said spindle adapter.

6. The accessory of claim 1, wherein said prong member has an upper surface and a lower surface, and further includes a plurality of prongs extending downwardly from said lower surface.

7. The accessory of claim 1, wherein said prong member has a head portion having upper and lower surfaces, a necked-in portion of circular cross-section extending upwardly from said upper surface, a plurality of prongs extending downwardly from said lower surface, and a cruciform axial aperture extending therethrough, said axial aperture being dimensioned to permit said prong member to slidably receive said skewer.

8. The accessory of claim 7, wherein said axial aperture has a first pair of opposed arms and a second pair of opposed arms perpendicular to said first pair of opposed arms, and wherein said prongs are positioned one midway between adjacent arms of said axial aperture.

9. The accessory of claim 8, wherein said prongs are centered on the circumference of a circle having a diameter approximately equal to the distance across two opposed arms of said axial aperture.

10. The accessory of claim 9, wherein said necked-in portion has a diameter less than that of said head portion and slightly greater than the greatest width of said skewer.

11. Apparatus for spiral slicing a boneless cut of meat, comprising:
   an upper support bracket;
   a rotatable turntable positioned below said support bracket, said turntable having a plurality of prongs extending upwardly therefrom;
   a skewer assembly including a skewer and a base for supporting said skewer, said skewer having an apex and a foot at opposite ends thereof, said foot being attached to said base, and said base having a plurality of holes formed therein dimensioned and positioned to receive said prongs of said turntable;
   a vertically-adjustable stop member slidably carried by said skewer;
   a vertically-adjustable prong member slidably carried by said skewer and positioned above said stop member; and
   a spindle assembly including bracket-engaging means for engaging said bracket and skewer-receiving means for receiving said apex of said skewer, said spindle assembly being vertically adjustable with respect to said bracket.

12. The apparatus of claim 11, wherein said skewer has a generally cruciform cross-section between said apex and said foot.

13. The apparatus of claim 12, wherein said stop member and said prong member each has an axial aperture therethrough of generally cruciform cross-section dimensioned to receive said skewer.

14. The apparatus of claim 11, further including locking means for locking said stop member in position on said skewer.

15. The apparatus of claim 11, wherein said bracket-engaging means comprises a rod, and wherein said spindle assembly further includes:
   a spindle having an upper and a lower end, said rod being inserted in said upper end; and
   a spindle adapter attached to said lower end, said skewer-receiving means comprising a longitudinal cylindrical bore formed in said spindle adapter.

16. The apparatus of claim 11, wherein said prong member has an upper surface and a lower surface, and further includes a plurality of prongs extending downwardly from said lower surface.

17. The apparatus of claim 11, wherein said prong member has a head portion having upper and lower surfaces, a necked-in portion of circular cross-section extending upwardly from said upper surface, a plurality of prongs extending downwardly from said lower surface, and a cruciform axial aperture extending therethrough, said axial aperture being dimensioned to permit said prong member to slidably receive said skewer.

18. The apparatus of claim 17, wherein said axial aperture has a first pair of opposed arms and a second pair of opposed arms perpendicular to said first pair of opposed arms, and wherein said prongs are positioned one midway between adjacent arms of said axial aperture.

19. The apparatus of claim 18, wherein said prongs are centered on the circumference of a circle having a diameter approximately equal to the distance across two opposed arms of said axial aperture.

20. The apparatus of claim 19, wherein said necked-in portion has a diameter less than that of said head portion and slightly greater than the greatest width of said skewer.

21. An accessory for supporting a boneless cut of meat, for use in conjunction with a spiral meat slicer having an upper support bracket and a rotatable turntable positioned below the support bracket, said accessory comprising:
 a skewer assembly including a skewer and a base for supporting said skewer, said skewer having an apex and a foot at opposite ends thereof, said foot being attached to said base, said base having engagement means for engaging the turntable, and said skewer having between said apex and said foot a transverse cross-section having a plurality of radially-extending projections;
 a vertically-adjustable prong member carried by said skewer; and
 a spindle assembly including bracket-engaging means for slidably engaging the bracket and skewer-receiving means for receiving said apex of said skewer.

22. The accessory of claim 21, wherein said skewer has a generally cruciform cross-section between said apex and said foot.

23. The accessory of claim 21, wherein said prong member has an axial aperture therethrough having a cross-section similar in configuration to said transverse cross-section of said skewer and dimensioned to slidably engage said skewer.

24. The accessory of claim 21, wherein said bracket-engaging means comprises a rod, and wherein said spindle assembly further includes:
 a spindle having an upper and a lower end, said rod being inserted in said upper end; and
 a spindle adapter attached to said lower end, said skewer-receiving means comprising a central cylindrical bore formed through said spindle adapter.

25. The accessory of claim 21, wherein said prong member has an upper surface and a lower surface, and further includes a plurality of prongs extending downwardly from said lower surface.

26. The accessory of claim 21, wherein said prong member has a head portion having upper and lower surfaces, a necked-in portion of circular cross-section extending upwardly from said upper surface, a plurality of prongs extending downwardly from said lower surface, and a central axial aperture formed through said head and said necked-in portion, said axial aperture having a cross-section similar in configuration to said transverse cross-section of said skewer and dimensioned to slidably engage said skewer.

27. The accessory of claim 26, wherein said axial aperture has a plurality of projections extending axially therefrom, and wherein said prongs are positioned one midway between adjacent arms of said axial aperture.

28. The accessory of claim 27, wherein said prongs are centered on the circumference of a circle having a diameter approximately equal to the greatest width of said axial aperture.

29. The accessory of claim 28, wherein said necked-in portion has a diameter less than that of said head portion and greater than the distance across two opposite prongs.

* * * * *